United States Patent
Ikeda et al.

(10) Patent No.: US 9,751,158 B2
(45) Date of Patent: Sep. 5, 2017

(54) STAINLESS STEEL FLUX CORED WIRE

(75) Inventors: Tetsunao Ikeda, Fujisawa (JP); Hiroshi Sugahara, Fujisawa (JP); Hirohisa Watanabe, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 1619 days.

(21) Appl. No.: 12/983,486

(22) Filed: Jan. 3, 2011

(65) Prior Publication Data

US 2011/0180523 A1 Jul. 28, 2011

(30) Foreign Application Priority Data

Jan. 27, 2010 (JP) ................... 2010-015981

(51) Int. Cl.
| | | |
|---|---|---|
| B23K 35/30 | (2006.01) | |
| B23K 35/02 | (2006.01) | |
| B23K 35/22 | (2006.01) | |
| B23K 35/36 | (2006.01) | |

(52) U.S. Cl.
CPC ...... B23K 35/3066 (2013.01); B23K 35/0266 (2013.01); B23K 35/22 (2013.01); B23K 35/304 (2013.01); B23K 35/3033 (2013.01); B23K 35/3605 (2013.01); B23K 35/3607 (2013.01); B23K 35/3608 (2013.01); B23K 35/3616 (2013.01)

(58) Field of Classification Search
CPC B23K 35/0266; B23K 35/22; B23K 35/3033; B23K 35/304; B23K 35/3066; B23K 35/3605; B23K 35/3607; B23K 35/3608; B23K 35/3616
USPC ............ 219/145.22, 146.23, 146.24, 146.51, 219/146.1; 148/23, 24
See application file for complete search history.

(56) References Cited

U.S. PATENT DOCUMENTS

| | | | | |
|---|---|---|---|---|
| 5,124,529 A | * | 6/1992 | Nishikawa et al. | 219/146.22 |
| 5,124,530 A | * | 6/1992 | O'Donnell et al. | 219/146.23 |
| 5,219,425 A | * | 6/1993 | Nishikawa et al. | 228/56.3 |
| 5,263,641 A | * | 11/1993 | Rafferty et al. | 228/220 |
| 5,378,871 A | * | 1/1995 | Nishikawa et al. | 219/145.22 |
| 5,861,605 A | * | 1/1999 | Ogawa et al. | 219/145.22 |
| 6,734,395 B2 | | 5/2004 | Watanabe et al. | |
| 7,743,967 B2 | * | 6/2010 | Frankel et al. | 228/262.3 |
| 2003/0196997 A1 | * | 10/2003 | Watanabe et al. | 219/145.22 |
| 2005/0189337 A1 | * | 9/2005 | Baune | 219/145.23 |
| 2006/0226138 A1 | | 10/2006 | James et al. | |

FOREIGN PATENT DOCUMENTS

| | | |
|---|---|---|
| EP | 1 361 016 A1 | 11/2003 |
| EP | 1 712 327 A1 | 10/2006 |
| EP | 1 769 882 A1 | 4/2007 |
| JP | 59-85396 | 5/1984 |
| JP | 6-114590 | * 4/1994 |
| JP | 3765772 | 2/2006 |
| JP | 2007-90376 | 4/2007 |

OTHER PUBLICATIONS

Extended European Search Report issued Apr. 11, 2011, in Application No. /Patent No. 11000154.2-2122.
U.S. Appl. No. 12/955,393, filed Nov. 29, 2010, Sugahara, et al.
U.S. Appl. No. 13/342,461, filed Jan. 3, 2012, Sugahara, et al.

* cited by examiner

*Primary Examiner* — David Angwin
*Assistant Examiner* — Frederick Calvetti
(74) *Attorney, Agent, or Firm* — Oblon, McClelland, Maier & Neustadt, L.L.P.

(57) ABSTRACT

In a stainless steel flux cored wire comprising a stainless steel shell and a flux filling the shell, the amount of Si contained in the entire wire is 2.5% by mass or higher, preferably 3.0% by mass or higher in terms of $SiO_2$, and the amount of at least one compound selected from the group consisting of polytetrafluoroethylene, graphite fluoride and perfluoropolyether contained in the flux is 0.005 to 0.10% by mass of the total mass of the wire in terms of F, preferably 0.020% by mass or higher. By employing such a constitution, in welding of Cr—Ni-based and Cr-based stainless steels and other materials, fume generation and hexavalent chromium leaching can be significantly reduced, and excellent welding workability can be provided.

12 Claims, No Drawings

STAINLESS STEEL FLUX CORED WIRE

FIELD OF THE INVENTION

The present invention relates to a stainless steel flux cored wire with a reduced amount of water-soluble hexavalent chromium contained in fumes generated in welding of stainless steel and other materials.

BACKGROUND OF THE INVENTION

In welding of stainless steel, flux cored wires are widely used since they have high welding speeds and have low spatter and thus requires little cleaning operations after welding. This flux cored wire is a composite wire comprising a shell made of mild steel or stainless steel with a powder filling of compounds such as metals, oxides or fluorides. In welding, this flux cored wire is supplied to a weld bead as a consumable electrode while an arc is successively generated to form molten metal.

When the flux cored wire is fused by the heat of arc at a high temperature, metallic components, oxides and fluorides are evaporated from the molten metal to produce fumes, which are particles connected in the form of a chain. It is known that in this welding environment, when a worker inhales scattered fumes, he/she develops metal fume fever or other problems. In particular, in welding of stainless steel, chromium contained in welding materials and stainless steel base material are contained in fumes in a high level, but a part of the chromium content is present in the form of hexavalent chromium, which is suspected to be carcinogenic and have other risks. Therefore, it is particularly harmful for human body. For this reason, it is necessary to prepare special equipment to keep workers from inhaling fumes during welding operations, which lowers welding workability.

To this end, a technique for suppressing leaching of hexavalent chromium from fumes by controlling the amount of Si, Ti, Zr, Na, K and Cr contained in a wire has been conventionally suggested (Japanese Patent No. 03765772). However, this prior art has the disadvantages of high spatter during welding and low slag removability, leading to poor welding workability. For this reason, this prior art has not been put into practical use. Techniques for suppressing leaching of hexavalent chromium from slags generated during welding have been suggested (Japanese Unexamined Patent Publications Nos. 2008-246523, 2009-154183, 2009-154183). However, these two prior art techniques cannot suppress leaching of hexavalent chromium from fumes. There are some prior art documents that discuss adding polytetrafluoroethylene (hereinafter referred to as PTFE) to a flux of a flux cored wire (Japanese Unexamined Patent Publication Nos. 2007-90376, H6-155080), but the object of these prior art documents is to reduce the amount of diffusible hydrogen of a weld metal of carbon steel and prevent weld flaws, and they are not directed to leaching of hexavalent chromium from fumes since almost no Cr is contained in the fumes.

As stated above, known stainless steel flux cored wires have not been successful in sufficiently reducing the amount of water-soluble hexavalent chromium contained in fumes generated during welding of Cr—Ni-based stainless steels such as SUS304 and SUS316, Cr-based stainless steel such as SUH409 and SUS430 and other materials.

SUMMARY OF THE INVENTION

The present invention has been made in view of such problems, and an object of the same is to provide a stainless steel flux cored wire which, in welding of Cr—Ni-based and Cr-based stainless steels and other materials, can significantly reduce fume generation and hexavalent chromium leaching, and can provide excellent welding workability.

The present invention is a stainless steel flux cored wire which is a stainless steel shell filled with a flux, and the entire wire has a total Si content in terms of $SiO_2$ of 2.5% by mass or higher, and contains, in the flux, at least one compound selected from the group consisting of polytetrafluoroethylene, graphite fluoride and perfluoropolyether in a total amount in terms of F of 0.005 to 0.10% by mass of the total mass of the wire. At this time, examples of Si-containing substances include metallic Si, $SiO_2$, $K_2SiF_6$ and feldspar, among others.

In this stainless steel flux cored wire, it is preferable that the total amount of at least one compound selected from the group consisting of polytetrafluoroethylene, graphite fluoride and perfluoropolyether contained is 0.020% by mass or higher of the total mass of the wire in terms of F; the total amount of Na, K and Li in the flux is controlled to 0.40% by mass or lower of the total mass of the wire; the amount of Cr contained in the entire wire is 17.0 to 21.0% by mass; the amount of Ni contained is 8.0 to 11.0% by mass; and the amount of Si contained in terms of $SiO_2$ is 3.0% by mass or higher.

Furthermore, it is preferable that the flux contains Ti oxide in an amount of 0.80% by mass or higher in terms of $TiO_2$; contains Zr oxide and Al oxide in a total amount of 0.05 to 3.20% by mass in terms of $ZrO_2$ and $Al_2O_3$; and contains alkali metal fluorides in a total amount of 0.02 to 0.30% by mass in terms of F.

According to the stainless steel flux cored wire of the present invention, in welding of materials such as stainless steel, leaching of hexavalent chromium from fumes generated can be significantly reduced. It should be noted that the stainless steel flux cored wire is a wire whose shell is made of stainless steel. Such a wire is generally used for welding of stainless steel, but can be also used for welding of mild steels other than stainless steel.

DETAILED DESCRIPTION OF THE INVENTION

The present invention will be specifically described below. The inventors of this application and others have investigated the form and composition of fumes generated during welding of materials such as stainless steel using a flux cored wire. The results show that the fumes are composite oxides which have a structure of minute spherical particles sized 1 μm or less connected in the form of a chain. Furthermore, it was found from the results of the crystal structure of fumes that there are two types of particles: crystalline particles having a particular atomic arrangement; and amorphous particles having a random atomic arrangement, and that in particular, the proportion of the amorphous gains tends to be higher. The reason why these amorphous particles are higher in amount is presumably that the shell of the flux cored wire or the flux charged into the wire has evaporated in the arc at a high temperature and rapidly cooled and solidified when scattered in the air so that amorphous particles are formed.

Analysis of the composition of the amorphous particles revealed that metallic components such as Fe, Cr, Si, Ti, Bi, Na, K and Li and nonmetallic components such as F and O were contained. Among the components of the crystalline particles and of the amorphous particles, components which leach from the fumes into water are particularly those which constitute the amorphous particles, and it is therefore expected that hexavalent chromium contained in the amorphous particles are dissolved in water.

To this end, a method for suppressing dissolution of the amorphous particles into water was explored by various experimental researches. As a result, it was found that the amounts of alkali metals, Si and fluorine contained in fumes greatly affect such dissolution. That is, the inventors of this application and others found that dissolution of fumes in water is promoted as the amount of alkali metals increases, while the water dissolution is suppressed as the amounts of Si and fluorine increase.

Based on such findings, the inventors of the present invention have developed a flux cored wire which can prevent the leaching of hexavalent chromium. That is, in a conventional wire, by increasing the amount of Si in the wire and adding polytetrafluoroethylene (PTFE), graphite fluoride, or fluorine oil to the flux, leaching of hexavalent chromium from fumes generated during welding can be significantly reduced.

Accordingly, in the stainless steel flux cored wire according to the present invention, the amount of Si contained in the entire wire is 2.5% by mass or higher of the total mass of the wire in terms of $SiO_2$. The wire also contains, in the flux one or more compounds selected from the group consisting of polytetrafluoroethylene, graphite fluoride and perfluoropolyether in an amount of 0.005 to 0.10% by mass of the total mass of the wire in terms of F. Preferably, one or more compounds selected from the group consisting of polytetrafluoroethylene, graphite fluoride and perfluoropolyether is contained in an amount of 0.020% by mass or higher of the total mass of the wire in terms of F. In addition, it is preferable that the total amount of one or more elements selected from the group consisting of Na, K and Li in the flux is controlled to be 0.40% by mass or lower of the total mass of the wire; the amount of Cr contained in the entire wire is 17.0 to 21.0% by mass; the amount of Ni contained is 8.0 to 11.0% by mass; and the amount of Si contained is 3.0% by mass or higher in terms of $SiO_2$.

The reasons why the respective numerical values are limited will be described now.

"At least one compound selected from the group consisting of polytetrafluoroethylene, graphite fluoride and perfluoropolyether is contained in the flux in a total amount of 0.005 to 0.10%, preferably 0.020 to 0.10% by mass of the total mass of the wire, in terms of F".

Adding this compound containing F to the flux suppresses leaching of hexavalent chromium from fumes since the fluorine component contained in fumes promotes amorphization of $SiO_2$. Polytetrafluoroethylene, graphite fluoride and perfluoropolyether all contain F in high concentrations, and have melting points and boiling points as low as 500° C. or below. Therefore, by adding a small amount of the above compound to the wire, F yields in the fumes at a high efficiency. Accordingly, the concentration of fluorine in the fumes is increased even by adding a minute amount of the compound, and leaching of hexavalent chromium is reduced.

When the above compound is added in a total amount of 0.005% by mass or higher of the total mass of the wire in terms of F, the concentration of fluorine in the fumes is increased, whereby leaching of hexavalent chromium can be suppressed. Preferably, the amount of the above compound is 0.020% by mass or higher. In contrast, if the above compound is added in a total amount of higher than 0.10% by mass of the total mass of the wire in terms of F, spatter generation increases, thereby lacking practicality. Hence, the above compound is contained in an amount of 0.005 to 0.10% by mass, preferably 0.020 to 0.10% by mass.

"The amount of Si contained in the entire wire is 2.5% by mass or higher, preferably 3.0% by mass or higher, in terms of $SiO_2$"

$SiO_2$ contained in fumes promotes the amorphization of the fumes. In order to increase the amount of $SiO_2$ contained in the fumes, the amount of Si contained in the wire needs to be 2.50% by mass or higher in terms of $SiO_2$.

If the amount of Si contained in the wire is lower than 2.5% by mass in terms of $SiO_2$, the amount of Si in the fumes becomes low, and the fumes are crystallized. This disadvantageously causes hexavalent chromium to dissolve in water. Preferably, the amount of Si contained in the wire is 3.0% by mass or higher in terms of $SiO_2$.

Sources of this Si include silica sand, zircon flour, feldspar and potassium fluorosilicate, among others.

"Preferably, the total amount of Na, K and Li in the flux is controlled to be 0.40% by mass or lower of the total mass of the wire"

If the total amount of Na, K and Li in the flux is 0.40% by mass or lower of the total mass of the wire, the amorphization of fumes further proceeds, and leaching of hexavalent chromium can be suppressed to 10 ppm or lower.

"Preferably, the amount of Cr contained in the entire wire is 17.0 to 21.0% by mass, and the amount of Ni contained is 8.0 to 11.0% by mass"

If the amount of Cr and Ni contained is within the range mentioned above, the amorphization of fumes further proceeds, and leaching of hexavalent chromium can be suppressed to 10 ppm or lower.

"Other Raw Materials Added to Flux"

Other raw materials added to the flux include metallic oxides such as Ti oxide, Zr oxide and Al oxide, alkali metal oxides and alkali metal fluorides, among others. Ti oxide functions to stabilize an arc, and forms slags covering the weld bead. In order to obtain these effects, Ti oxide is added in an amount of 0.80% by mass or higher in terms of $TiO_2$. Raw materials of Ti oxides include rutile, iluminite and potassium titanate, among others. These raw materials are added singly or in combination of two or more types. Zr oxide and Al oxide not only improve the fluidity of slags, but are also effective in increasing the melting point of slags to enable vertical position welding. If the amounts of these Zr oxide and Al oxide are high, covering of slags becomes ununiform and the configuration of the bead becomes uneven. Therefore, Zr oxide and Al oxide are preferably added in a total amount 0.05 to 3.20% by mass in terms of $ZrO_2$ and $Al_2O_3$.

Alkali metal oxides function to smoothen the bead by stabilizing an arc and lower the viscosity of molten slags. In order to obtain these effects, oxides of Na, K and Li are preferably added in a total amount of 0.06% by mass or higher. However, if the amount of these oxides of Na, K and Li is not limited to 0.50% by mass or lower, removal of droplets from the tip of the wire is disturbed and spatter generation is increased. For this reason, when alkali metal oxides (mainly oxides of Na, K and Li) are contained, their total amount is controlled to be 0.06 to 0.50% by mass. Oxides of Na, K and Li can be feldspar, cryolite, lithium ferrite and potash glass, which may be added singly or in combination of two or more raw materials.

Alkali metal fluorides not only function to stabilize an arc, but also improve the removability of slags and suppress generation of pore defects in the weld metal. When the amount of alkali metal fluorides added is too high, covering of slags becomes uneven and seizure of slags occurs. Therefore, the amount of alkali metal fluorides, when added, is controlled to be 0.02 to 0.30% by mass in terms of F. These alkali metal fluorides can be sodium fluoride, barium fluoride and magnesium fluoride, which may be added singly or in combination of two or more kinds.

"Components of the Remainder"

The other components in the remainder of the wire are mainly composed of Fe derived from the stainless steel shell, various kinds of Fe alloys contained in the flux (Fe—Mn, Fe—Si, Fe—Ti alloys, etc.), and Fe derived from an iron powder, and contain Fe in an amount ranging from 50 to 65% by mass. In addition, depending on corrosion resistance, mechanical performance and other properties required for the weld metal, additional alloy components such as Si, Mn, Mo, Nb and Ti and inevitably contained impurities are present.

EXAMPLES

Examples of the present invention will be described below in comparison to Comparative Examples, which fall outside the scope of the present invention. Weld fumes were collected from the flux cored wires shown in Table 1-1 and Table 1-2 (Examples) and Table 2 (Comparative Example) below, and leaching test liquids were analyzed. Collection of the fumes was performed according to JIS Z3930:2001 (Determination of emission rate of particulate fume in arc welding), by conducting welding in a fume emission rate measuring device continuously for 5 minutes, collecting the fumes generated during the welding with a filter, and immediately storing the fumes in a desiccator.

As for the welding conditions, the welding current was 200 A; arc voltage was 30 V; and welding was carried out in 100% $CO_2$ gas atmosphere. 1 g of fumes collected with the filter was mixed into 100 g of distilled water, and the mixture was boiled in a water tank maintained at 70° C. for an hour. The mixed solution was then filtrated by suction with a 0.5 μm glass fiber filter, and the filtrate was used as a leaching test liquid.

This leaching test liquid was immediately analyzed for the concentration of hexavalent chromium by the diphenylcarbazide absorptiometry to determine the concentration of hexavalent chromium leached into the fumes (ppm). The results of this hexavalent chromium concentration analysis are shown in Table 3 (Example) and Table 4 (Comparative Example) below. These Tables 3 and 4 also show the amounts of $SiO_2$ (%) and F (%) in the fumes. In Tables 3 and 4, the wires having an amount of hexavalent chromium leached higher than 100 ppm were evaluated as "×", 10 to 100 ppm as "○", and lower than 10 ppm as "⊙". It should be noted that Comparative Example 10 had an amount of hexavalent chromium leached lower than 10 ppm, but had a large amount of spatter, and was therefore given the overall judgment "×".

As can be seen from Tables 1-1, 1-2, 2, 3 -1, 3 -2 and 4, Comparative Examples 1 to 12 had the total amount of polytetrafluoroethylene, graphite fluoride and perfluoropolyether falling outside the scope of the present invention, and therefore showed the amount of hexavalent chromium leached higher than 100 ppm. In contrast, in Examples 1 to 5, 11 and 13 to 15, the total amount of polytetrafluoroethylene, graphite fluoride and perfluoropolyether falls within the scope of the present invention, and therefore showed the amount of hexavalent chromium leached lower than 100 ppm. Since Examples 6 to 10, 12, 16, 18, 21 and 22 had the amount of $SiO_2$ of 3.0% by mass or higher; the total amount of polytetrafluoroethylene, graphite fluoride and perfluoropolyether of 0.020% by mass or higher; the amounts of Cr and Ni falling within the more preferable scope of the present invention; and the amount of $TiO_2$ and the like falls within the scope defined above, they had even lower amounts of hexavalent chromium leached: as low as below 10 ppm. Since Examples 17, 19 and 20 also fall within the more preferable scope of the present invention, they show even lower amounts of hexavalent chromium leached: as low as below 10 ppm.

TABLE 1-1

| | Example | | | | | | | | | |
|---|---|---|---|---|---|---|---|---|---|---|
| | 1 | 2 | 3 | 4 | 5 | 6 | 7 | 8 | 9 | 10 |
| Shell material | 304L | 304L | 304L | 304L | 304L | 304L | 304L | 304L | 304L | 316L |
| Percentage Flux (%) | 25 | 25 | 25 | 25 | 29 | 25 | 25 | 25 | 25 | 28 |
| Wire diameter (mm) | 1.2 | 1.2 | 1.2 | 1.2 | 1.2 | 1.2 | 1.2 | 1.2 | 1.6 | 1.2 |
| Wire Cr | 19.2 | 18.8 | 19.2 | 18.4 | 24.0 | 19.0 | 18.7 | 18.8 | 18.8 | 18.0 |
| Ni | 8.9 | 8.1 | 9.0 | 8.1 | 12.2 | 9.0 | 8.4 | 9.0 | 8.4 | 10.5 |
| Mo | 0.03 | 0.03 | 0.03 | 0.03 | 0.01 | 0.03 | 0.01 | 0.03 | 0.01 | 2.53 |
| $SiO_2$ | 2.9 | 2.9 | 2.9 | 3.4 | 3.5 | 3.2 | 3.6 | 3.2 | 3.2 | 3.2 |
| $TiO_2$ | 1.4 | 1.4 | 1.4 | 1.4 | 1.2 | 1.4 | 1.1 | 1.4 | 1.7 | 1.6 |
| $ZrO_2 + Al_2O_3$ | 1.7 | 1.7 | 1.7 | 1.7 | 1.9 | 1.7 | 1.6 | 1.7 | 1.6 | 1.1 |
| Na + K + Li | 0.56 | 0.30 | 0.43 | 0.30 | 0.25 | 0.30 | 0.25 | 0.30 | 0.25 | 0.25 |
| Metallic fluoride (in terms of fluorine) | 0.16 | 0.10 | 0.12 | 0.08 | 0.04 | 0.08 | 0.06 | 0.08 | 0.06 | 0.04 |
| F PTFE | 0.03 | 0.01 | 0.06 | 0.01 | 0.03 | 0.03 | 0.01 | 0.06 | 0 | 0.03 |
| Graphite fluoride | 0 | 0 | 0 | 0 | 0 | 0 | 0.01 | 0 | 0 | 0 |
| Perfluoropolyether | 0 | 0 | 0 | 0 | 0 | 0 | 0.01 | 0 | 0.03 | 0 |
| F in total | 0.03 | 0.01 | 0.06 | 0.01 | 0.03 | 0.03 | 0.03 | 0.06 | 0.03 | 0.03 |

TABLE 1-2

| | Example | | | | | | | | | | | |
|---|---|---|---|---|---|---|---|---|---|---|---|---|
| | 11 | 12 | 13 | 14 | 15 | 16 | 17 | 18 | 19 | 20 | 21 | 22 |
| Shell material | 304L | 304L | 316L | 304L | 304L | 304L | 304L | 304L | 304L | 304L | 304L | 304L |
| Percentage flux (%) | 25 | 25 | 25 | 25 | 25 | 25 | 25 | 25 | 25 | 25 | 25 | 25 |

TABLE 1-2-continued

|  | | Example | | | | | | | | | | | |
|---|---|---|---|---|---|---|---|---|---|---|---|---|---|
|  | | 11 | 12 | 13 | 14 | 15 | 16 | 17 | 18 | 19 | 20 | 21 | 22 |
| Wire diameter (mm) | | 1.2 | 1.2 | 1.2 | 1.2 | 1.2 | 1.2 | 1.2 | 1.2 | 1.6 | 1.2 | 1.2 | 1.2 |
| Wire | Cr | 19.2 | 18.8 | 16.7 | 19.0 | 21.6 | 20.5 | 19.2 | 19.4 | 19.2 | 19.3 | 18.9 | 19.2 |
|  | Ni | 8.9 | 9.0 | 9.0 | 7.7 | 9.8 | 9.7 | 9.1 | 9.1 | 9.0 | 9.1 | 8.8 | 9.1 |
|  | Mo | 0.02 | 0.03 | 2.30 | 0.02 | 0.02 | 0.03 | 0.02 | 0.02 | 0.01 | 0.01 | 0.02 | 0.02 |
|  | $SiO_2$ | 2.6 | 3.2 | 3.2 | 3.2 | 3.2 | 3.4 | 3.1 | 3.2 | 3.6 | 3.2 | 3.4 | 3.3 |
|  | $TiO_2$ | 1.4 | 1.4 | 1.6 | 1.4 | 1.2 | 1.3 | 0.7 | 0.9 | 2.9 | 1.0 | 2.8 | 1.1 |
|  | $ZrO_2 + Al_2O_3$ | 1.7 | 1.7 | 1.1 | 1.7 | 1.9 | 1.8 | 2.2 | 2.1 | 0.03 | 3.4 | 0.06 | 3.1 |
|  | Na + K + Li | 0.30 | 0.30 | 0.30 | 0.30 | 0.30 | 0.40 | 0.32 | 0.32 | 0.28 | 0.28 | 0.28 | 0.28 |
|  | Metallic fluoride (in terms of fluorine) | 0.15 | 0.08 | 0.08 | 0.08 | 0.08 | 0.10 | 0.10 | 0.10 | 0.08 | 0.08 | 0.09 | 0.09 |
|  | F  PTFE | 0.03 | 0.09 | 0.03 | 0.03 | 0.03 | 0.06 | 0.03 | 0.03 | 0.03 | 0.03 | 0.03 | 0.03 |
|  | Graphite fluoride | 0 | 0 | 0 | 0 | 0 | 0 | 0 | 0 | 0 | 0 | 0 | 0 |
|  | Perfluoropolyether | 0 | 0 | 0 | 0 | 0 | 0 | 0 | 0 | 0 | 0 | 0 | 0 |
|  | F in total | 0.03 | 0.09 | 0.03 | 0.03 | 0.03 | 0.06 | 0.03 | 0.03 | 0.03 | 0.03 | 0.03 | 0.03 |

TABLE 2

|  | | Comparative Example | | | | | | | | | | | |
|---|---|---|---|---|---|---|---|---|---|---|---|---|---|
|  | | 1 | 2 | 3 | 4 | 5 | 6 | 7 | 8 | 9 | 10 | 11 | 12 |
| Shell material | | 304L | 304L | 304L | 304L | 304L | 304L | 316L | 304L | 304L | 304L | 304L | 304L |
| Percentage flux (%) | | 25 | 27 | 26 | 26 | 26 | 24 | 24 | 33 | 29 | 25 | 25 | 25 |
| Wire diameter (mm) | | 1.2 | 1.2 | 1.2 | 1.2 | 1.6 | 1.2 | 1.2 | 1.2 | 1.6 | 1.2 | 1.2 | 1.2 |
| Wire | Cr | 19.5 | 19.0 | 18.5 | 18.4 | 24.6 | 22.9 | 17.6 | 19.8 | 24.0 | 19.5 | 19.2 | 24.6 |
|  | Ni | 8.9 | 9.0 | 8.1 | 8.4 | 7.9 | 10.9 | 10.7 | 8.9 | 12.2 | 8.9 | 9.1 | 7.9 |
|  | Mo | 0.03 | 0.03 | 0.02 | 0.01 | 2.78 | 2.48 | 2.32 | 0.03 | 0.01 | 0.02 | 0.02 | 2.65 |
|  | $SiO_2$ | 2.9 | 3.5 | 1.4 | 1.3 | 1.5 | 2.7 | 1.5 | 3.0 | 3.3 | 3.3 | 3.5 | 2.3 |
|  | $TiO_2$ | 1.4 | 1.9 | 8.8 | 7.4 | 4.6 | 6.2 | 7.2 | 5.6 | 1.2 | 1.9 | 1.3 | 4.6 |
|  | $ZrO_2 + Al_2O_3$ | 1.7 | 1.3 | 1.5 | 2.7 | 0.0 | 0.8 | 0.2 | 0.1 | 1.9 | 1.4 | 2.5 | 0.0 |
|  | Na + K + Li | 0.35 | 0.20 | 0.45 | 0.26 | 0.24 | 0.26 | 0.34 | 0.32 | 0.25 | 0.18 | 0.35 | 0.18 |
|  | Metallic fluoride (in terms of fluorine) | 0.08 | 0.06 | 0.18 | 0.20 | 0.22 | 0.16 | 0.19 | 0.15 | 0.04 | 0.10 | 0.10 | 0.10 |
|  | F  PTFE | 0 | 0 | 0.002 | 0 | 0.001 | 0 | 0.002 | 0 | 0 | 0.12 | 0.003 | 0.001 |
|  | Graphite fluoride | 0 | 0 | 0 | 0 | 0 | 0 | 0 | 0 | 0 | 0 | 0 | 0 |
|  | Perfluoropolyether | 0 | 0 | 0 | 0 | 0 | 0 | 0 | 0 | 0 | 0 | 0 | 0 |
|  | F in total | 0 | 0 | 0.002 | 0 | 0.001 | 0 | 0.002 | 0 | 0 | 0.12 | 0.003 | 0.001 |

TABLE 3-1

|  | | Example | | | | | | | | | |
|---|---|---|---|---|---|---|---|---|---|---|---|
|  | | 1 | 2 | 3 | 4 | 5 | 6 | 7 | 8 | 9 | 10 |
| $SiO_2$ | % | 16.2 | 16.2 | 16.5 | 16.2 | 17.3 | 16.3 | 16.3 | 16.5 | 15.8 | 16.1 |
| F | % | 7.7 | 7.1 | 8.5 | 7.0 | 7.4 | 7.5 | 8.1 | 9.6 | 7.9 | 7.7 |
| Leaching Hexavalent chromium | ppm | 94 | 82 | 28 | 66 | 91 | Below 10 | Below 10 | Below 10 | Below 10 | Below 10 |
| Overall judgment | | ○ | ○ | ○ | ○ | ○ | ◎ | ◎ | ◎ | ◎ | ◎ |

TABLE 3-2

|  | | Example | | | | | | | | | | | |
|---|---|---|---|---|---|---|---|---|---|---|---|---|---|
|  | | 11 | 12 | 13 | 14 | 15 | 16 | 17 | 18 | 19 | 20 | 21 | 22 |
| $SiO_2$ | % | 15.9 | 16.1 | 15.9 | 16.5 | 16.1 | 16.5 | 15.8 | 16.1 | 17.1 | 16.6 | 17.7 | 15.8 |
| F | % | 7.5 | 10.4 | 7.1 | 7.6 | 7.3 | 7.3 | 7.8 | 8.2 | 7.8 | 7.4 | 7.7 | 8.0 |
| Leaching Hexavalent chromium | ppm | 81 | Below 10 | 66 | 81 | 78 | Below 10 | Below 10 | Below 10 | Below 10 | Below 10 | Below 10 | Below 10 |
| Overall judgment | | ○ | ◎ | ○ | ○ | ○ | ◎ | ◎ | ◎ | ◎ | ◎ | ◎ | ◎ |

TABLE 4

| | | Comparative Example | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| $SiO_2$ | % | 17.3 | 19.2 | 8.2 | 7.5 | 7.3 | 15.3 | 7.5 | 15.2 | 17.3 | 16.5 | 16.2 | 14.2 |
| F | % | 4.6 | 3.7 | 8.1 | 8.4 | 7.9 | 6.8 | 8.2 | 7.1 | 3.5 | 10.3 | 5.7 | 6.1 |
| Leaching Hexavalent chromium | ppm | 860 | 120 | 1120 | 1160 | 1600 | 1530 | 880 | 940 | 1230 | Below 10 | 480 | 380 |
| Overall judgment | | x | x | x | x | x | x | x | x | x | x | x | x |

What is claimed is:

1. A stainless steel flux cored wire comprising a stainless steel shell and a flux filling the shell,
   an amount of Si contained in the entire wire being 2.5% by mass or higher in terms of $SiO_2$, and
   a total amount of at least one compound selected from the group consisting of polytetrafluoroethylene, graphite fluoride and perfluoropolyether contained in the flux being 0.005 to 0.10% by mass of the total mass of the wire in terms of F.

2. The stainless steel flux cored wire according to claim 1, wherein
   the amount of at least one compound selected from the group consisting of polytetrafluoroethylene, graphite fluoride and perfluoropolyether contained is 0.020% by mass or higher of the total mass of the wire in terms of F.

3. The stainless steel flux cored wire according to claim 1, wherein
   a total amount of Na, K and Li in the flux is controlled to be 0.40% by mass or lower of the total mass of the wire.

4. The stainless steel flux cored wire according to claim 1, wherein
   the amount of Cr contained in the entire wire is 17.0 to 21.0% by mass, and the amount of Ni contained is 8.0 to 11.0% by mass.

5. The stainless steel flux cored wire according to claim 1, wherein
   the amount of Si contained is 3.0% by mass or higher in terms of $SiO_2$.

6. The stainless steel flux cored wire according to claim 1, wherein
   the flux contains Ti oxide in an amount of 0.80% by mass or higher in terms of $TiO_2$.

7. The stainless steel flux cored wire according to claim 1, wherein
   the wire contains Zr oxide and Al oxide in a total amount of 0.05 to 3.20% by mass in terms of $ZrO_2$ and $Al_2O_3$.

8. The stainless steel flux cored wire according to claim 1, wherein
   the wire contains alkali metal fluoride in a total amount of 0.02 to 0.30% by mass in terms of F.

9. The stainless steel flux cored wire according to claim 1, wherein the flux contains polytetrafluoroethylene.

10. The stainless steel flux cored wire according to claim 1, wherein the flux contains graphite fluoride.

11. The stainless steel flux cored wire according to claim 1, wherein the flux contains perfluoropolyether.

12. The stainless steel flux cored wire according to claim 1, wherein the total amount of Na, K and Li is 0.06 to 0.50 by mass.

* * * * *